United States Patent
Pisklak et al.

(10) Patent No.: US 11,680,197 B2
(45) Date of Patent: Jun. 20, 2023

(54) POZZOLANIC BY-PRODUCT FOR SLURRY YIELD ENHANCEMENT

(71) Applicant: Halliburton Energy Services, Inc., Houston, TX (US)

(72) Inventors: Thomas Jason Pisklak, Cypress, TX (US); Claudia Carmen Pineda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 329 days.

(21) Appl. No.: 17/198,472

(22) Filed: Mar. 11, 2021

(65) Prior Publication Data

US 2021/0198551 A1    Jul. 1, 2021

Related U.S. Application Data

(62) Division of application No. 16/551,439, filed on Aug. 26, 2019, now Pat. No. 11,001,742.

(51) Int. Cl.
| | |
|---|---|
| C09K 8/16 | (2006.01) |
| C09K 8/14 | (2006.01) |
| C04B 28/04 | (2006.01) |
| C04B 28/10 | (2006.01) |
| C04B 41/00 | (2006.01) |
| C09K 8/504 | (2006.01) |
| C04B 18/162 | (2023.01) |
| C04B 18/06 | (2006.01) |
| C04B 18/08 | (2006.01) |

(52) U.S. Cl.
CPC ............ *C09K 8/145* (2013.01); *C04B 18/067* (2013.01); *C04B 18/08* (2013.01); *C04B 18/162* (2013.01); *C04B 28/04* (2013.01); *C04B 28/10* (2013.01); *C04B 41/009* (2013.01); *C09K 8/16* (2013.01); *C09K 8/5045* (2013.01)

(58) Field of Classification Search
CPC ........ C09K 8/145; C09K 8/5045; C09K 8/16; C04B 18/067; C04B 18/08; C04B 18/162; C04B 28/04; C04B 28/10; C04B 41/009
See application file for complete search history.

(56) References Cited

U.S. PATENT DOCUMENTS

| | | | | |
|---|---|---|---|---|
| 2,396,509 | A | * | 3/1946 | Hertzell ............... C04B 28/26 106/632 |
| 7,213,646 | B2 | | 5/2007 | Roddy et al. |
| 2003/0188667 | A1 | | 10/2003 | Beard et al. |
| 2006/0270565 | A1 | | 11/2006 | Brothers et al. |
| 2007/0089880 | A1 | | 4/2007 | Roddy et al. |
| 2012/0252705 | A1 | | 10/2012 | Sarap et al. |
| 2017/0073568 | A1 | | 3/2017 | Roddy |
| 2017/0321104 | A1 | | 11/2017 | Ravi et al. |

FOREIGN PATENT DOCUMENTS

| | | |
|---|---|---|
| EP | 1814958 | 8/2007 |
| WO | 2004-109056 | 12/2004 |

OTHER PUBLICATIONS

International Search Report and Written Opinion for Application No. PCT/US2019/048254, dated May 25, 2020.
Office Action dated Nov. 12, 2020 for U.S. Appl. No. 16/551,439.

\* cited by examiner

*Primary Examiner* — Alicia Bland
(74) *Attorney, Agent, or Firm* — Thomas Rooney; C. Tumey Law Group PLLC

(57) ABSTRACT

A method may include providing a cement composition comprising ground vitrified clay, hydrated lime, and water; and introducing the cement composition into a subterranean formation.

19 Claims, 3 Drawing Sheets

POZZOLANIC BY-PRODUCT FOR SLURRY YIELD ENHANCEMENT

BACKGROUND

In cementing operations, such as well construction and remedial cementing, cement compositions are commonly utilized. Cement compositions may be used in primary cementing operations whereby pipe strings, such as casing and liners, are cemented in wellbores. In a typical primary cementing operation, a cement composition may be pumped into an annulus between the exterior surface of the pipe string disposed therein and the walls of the wellbore (or a larger conduit in the wellbore). The cement composition may set in the annular space, thereby forming an annular sheath of hardened, substantially impermeable material (e.g., a cement sheath) that may support and position the pipe string in the wellbore and may bond the exterior surface of the pipe string to the wellbore walls (or the larger conduit). Among other things, the cement sheath surrounding the pipe string should function to prevent the migration of fluids in the annulus, as well as protecting the pipe string from corrosion. Cement compositions also may be used in remedial cementing methods, such as in squeeze cementing for sealing voids in a pipe string, cement sheath, gravel pack, subterranean formation, and the like.

A design consideration for a cement composition may be slurry density. Providing a cement composition with a density within a safe operational envelope may be important to ensure that the set cement provides effective zonal isolation. Most subterranean formations may have an upper density limit defined by the fracture gradient of the subterranean formation. If a cement has a high density whereby the pressure of the cement column on the subterranean formation exceeds the fracture gradient, the cement may cause the formation to fracture, leading to loss of cement and potential formation damage. Even if the cement does not fracture the formation, providing a cement with too high density may cause cement to leak off into the formation which may lead to formation damage and additional cost of cement to "make up" the cement lost. However, a lower density limit may be defined by the formation fluid pressure at the wellbore walls, for example. The cement composition generally must have sufficient density to minimize or prevent formation fluids from entering the wellbore before the cement has set. Without sufficient density, the formation fluids may flow into the cement column which may weaken the cement.

Slurry density may be controlled by adjusting the amount of water in a cement composition. For example, a cement may be produced with relatively higher amounts of water if a lower density cement is desired or relatively lower amounts of water if a higher density cement is desired. The slurry may also include lightweight cement additives such as hollow beads or other relatively low-density additives that may aid in lowering density or heavy cement additives such as weighting agents or other relatively high-density additives which may increase density. However, adjusting cement density by changing water content or adding cement additives may affect other properties of the cement composition such as compressive strength, thickening time, rheology, fluid loss, free fluid, and fluid stability among others readily recognized by those of ordinary skill in the art. Furthermore, some additives may be incompatible with each other or require excessive water to hydrate.

BRIEF DESCRIPTION OF THE DRAWINGS

These drawings illustrate certain aspects of some of the examples of the present disclosure and should not be used to limit or define the disclosure.

DETAILED DESCRIPTION

Figure 1:
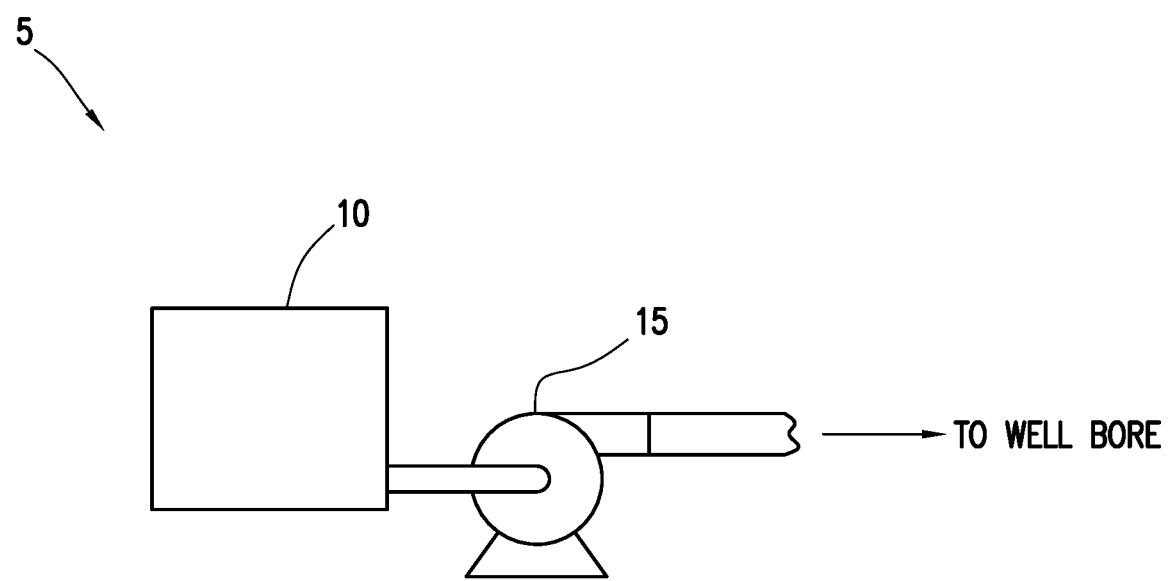
FIG. 1 is a schematic illustration of an example system for the preparation and delivery of a cement composition including ground vitrified clay to a wellbore.

The present disclosure may relate to cementing and, in particular, to methods, compositions, and systems utilizing a cement composition including ground vitrified clay (GVC). Ground vitrified clay is a product manufactured by blending clay and shale which is then fired at a temperature above the glass transition temperate of the blend to cause at least partial vitrification of the blend. Oftentimes, one or more additional minerals such as slate are also blended in the GVC. The vitrified mass is then subsequently cooled and ground to form the ground vitrified clay.

Ground vitrified clay may be a by-product of the manufacture of vitrified clay pipe. Vitrified clay pipe is commonly used in sewer collection mains because of its resistance to chemical and physical corrosion and long service life. While many individual compositions of vitrified clay pipe may be made, vitrified clay pipes are usually made from clays and shales and, in some instances, slate. The principal steps involved in manufacturing vitrified clay pipe may include mining, grinding, extruding, drying, and firing. The principal standards for composition, testing, and installation of vitrified clay pipe in the United States are published by ASTM international in publications such as:

1. ASTM C12 "Standard Practice for Installing Vitrified Clay Pipe Lines", published 2002
2. ASTM C301 "Standard Test Methods for Vitrified Clay Pipe", published 2018
3. ASTM C425 "Standard Specification for Compression Joints for Vitrified Clay Pipe and Fittings", published 2018
4. ASTM C700 Standard Specification for Vitrified Clay Pipe, Extra Strength Standard Strength and Perforated", published 2018
5. ASTM C828 "Standard Test Method for Low-Pressure Air Test of Vitrified Clay Pipe Lines", published 2016
6. ASTM C896 "Standard Definitions of Terms Relating to Clay Products", published 2017
7. ASTM C1091 "Standard Test Method for Hydrostatic Infiltration Testing of Vitrified Clay Pipe Lines", published 2018, and
8. ASTM C1208/1208M "Standard Specification for Vitrified Clay Pipe and Joints for Use in Jacking, Sliplining, Pipe Bursting and Tunnels", published 2018.

Not all clays, shales, and slates may be suitable for use in vitrified clay pipe as the mineral content of each material must be selected such that the resultant pipe meets applicable standards. The clay, shale, and slate materials typically include hydrous alumina silicates which have an appropriate level of plasticity, suitable vitrification properties, and stability at elevated temperatures. Materials selected for use in vitrified clay pipe applications will generally be laboratory tested to determine the physicochemical properties to ensure that the resultant pipe meets at least some of the standards outlined by the ASTM or other governing body in the jurisdiction where the vitrified clay pipe is to be used. After the materials have been mined and selected, the materials may be ground and sieved to select for particle sizes appropriate for a particular application. The materials may be mixed to selected proportions with water to form a paste. The paste may be forced through a vacuum and de-airing chamber to remove gasses entrained in the paste to produce a smooth, dense mixture. The paste may then be extruded under pressure to form a pipe which is then transferred to a heated drying room whereby moisture is removed from the pipe. After drying, the pipe is fired in a kiln at temperatures above the glass transition temperature of the materials, for example, about 2000° F. (1100° C.). The firing process begins to liquefy a portion of the interior of the pipe body by heating the pipe body above the glass transition temperature of the materials to create a molten glassy phase. The firing process causes a progressive partial fusion of the materials such that the proportion of glassy bonds within the pipe body increase and at the same time reducing the apparent porosity of materials. Reducing apparent porosity also reduces the water absorption capability of the vitrified clay pipe. The ASTM criteria for vitrified clay pipe require less than 1% water absorption which in turn sets the degree of vitrification required for the product vitrified clay pipe. Vitrified clay pipe is therefore a solid ceramic structure characterized by a glassy phase comprised of materials, which have been vitrified such that the vitrified clay pipe has less than 1% water absorption as defined by one or more of the ASTM standards previously listed. The materials in the vitrified clay pipe include clay and can optionally include one or more of shale and/or slate. As such, ground vitrified clays, and by extension, ground vitrified pipe, may be differentiated from other vitrified materials such as vitrified shale due to the unique composition of the glassy phase of ground vitrified clay.

During the production of the vitrified clay pipe, some pipes may be deemed unusable either due to material damage during one or more of the manufacturing steps or because the pipe did not meet the standards for vitrified clay pipe. There may be other vitrified by-product steams generated during the production of the vitrified clay pipe as well such as excess clay shavings, for example. The vitrified clay pipe and other vitrified by-product steams may be collected and ground to form ground vitrified pipe (GVP). One source of ground vitrified clay may be the production of vitrified pipe. However, there may be other industries where vitrified clay may be produced, either as an intended product or as a by-product, which may also be ground to form ground vitrified clay (GVC).

The GVC may be included in a cement composition "as is," meaning that no additional treatment or processing is performed on the GVC before inclusion in the cement composition. Alternatively, the GVC may be treated and/or processed before inclusion in the cement composition. GVC may have many beneficial properties that make it suitable for inclusion in cement compositions, only some of which may be enumerated herein. For example, cement compositions which include GVC may be blended to relatively lower densities while exhibit equal or better mechanical properties as compared to a conventional "neat" Portland cement which contains only Portland cement and water blended to the same density or compared to cement slurries containing pozzolans and Portland cement blended to the same density. Cement composition density is often reduced by blending the cement composition with a larger volume of water until the desired density is reached. Cement compositions blended with larger volumes of water may exhibit lower compressive strengths as compared to cement compositions which are blended with a relatively smaller amount of water.

Cement compositions including GVC may have applications in oil well cementing and may be particularly advantageous to use where the formation fracture gradient is low and a reduced density cement composition must be used to avoid formation damage while still retaining compressive strength for effective zonal isolation.

GVC may have a relatively high water requirement as compared to other cementitious components. A water requirement may be the water required to fully hydrate a cementitious component or additive. Water requirement is typically defined as the amount of mixing water that is required to be added to a powdered, solid material to form a slurry of a specified consistency. The consistency may vary for a particular application. Cement compositions may be analyzed to determine their water requirement. The following example technique for determining water requirement holds the consistency and amount of water constant while varying the amount of the solid material. However, techniques may also be applied that vary the amount of the water, the consistency, and/or the amount of solid material in any combination. The following technique also estimates the specified consistency based on the size of the vortex at the surface of the mixture in the blender. Water requirement for a particular cement composition may be determined by a process that includes a) preparing a blender (e.g., Waring® blender) with a specified amount of water (e.g., about 100 grams to about 500 grams), b) agitating the water at a specified blender rpm (e.g., 4,000 to 15,000 rpm), c) adding the powdered solid that is being investigated to the water until a specified consistency is obtained, and d) calculating the water requirement based on the ratio of water to solids required to obtain the desired consistency. A specific example for determining water requirement may include, but is not limited to: 1) preparing a blender (e.g., Waring® blender) with a specified amount of water (e.g., about 100 grams to about 500 grams or about 200 grams in one example); 2) agitating the water at a specified blender rpm (e.g., about 4,000 to about 15,000 rpm or about 12,000 rpm in one example); 3) adding a specified amount (e.g., about 1 gram to about 1,000 grams or about 400 grams in one example) of the cement composition to the water to form a mixture; 4) observing the mixture to determine if a specified consistency is obtained, for example, the cement composition can be considered thoroughly wet and mixed if the vortex formed at the surface of the mixture in the blender is about 0 inches (0 mm) to about 2 inch (50 mm) or about 0.004 inches (0.1 mm) to about 1 inch (25 mm); 5) if the desired consistency is not obtained, adding more cement composition until desired consistency is obtained, for example, the vortex formed in the blender is about the size of a dime; and 6) calculating the water requirement based on the ratio of water to cement composition to obtain the desired consistency. In some examples, the specific consistency may be where a vortex at the surface of the mixture in the blender is the size of a dime or about 0.7 in (17.9 mm). Other suitable techniques for determining the water requirement may also be used as will be appreciated by those of ordinary skill in the art.

Some examples of GVC may have a water requirement at a point in a range of about 40 grams to about 60 grams of water per 100 grams of GVC. Alternatively, the GVC may have water requirement at a point in a range of from about 40 to about 50 grams of water per grams of GVC, at a point in a range of from about 50 to about 55 grams of water per 100 grams of GVC, at a point in a range of from about 55 to about 60, or any points therebetween. Any ranges of water requirement disclosed herein are merely exemplary and the water requirement for any particular sample of GVC may fall outside the ranges explicitly recited. One of ordinary skill in the art, with the benefit of this disclosure should be able to determine a water requirement of any sample of GVC.

As one of ordinary skill in the art will appreciate, a cement composition generally should have a water content that does not result in undesirable free water or separation of water from the bulk cement composition. Free water may be an aqueous phase that separates from a slurry or mixture of fluids. In cementing operations, free water is generally undesirable since channels can form through the set cement, providing potential gas migration paths. When processing reservoir fluids, the water that separates easily under gravity separation is known as free water. In some cases, additional water may be locked in an emulsion, contributing to the aqueous phase but not available as free water. As one of ordinary skill in the art will appreciate API RP 10B-2, *Recommended Practice for Testing Well Cements*, First Edition, July 2005 provides methods to determine free water for a cement composition. Free water may cause problems in wellbore cementing, especially in deviated wellbores such as horizontal wellbores. Water that separates from the bulk cement composition may migrate to the top of a conduit to be cemented resulting in pockets where the cement composition is not in contact with the subterranean formation. These pockets of free water may cause problems such as loss of zonal isolation, conduit corrosion, wellbore collapse, and other problems. It is therefore typically preferred that cement compositions have little to no free water present in the set composition.

A common and inexpensive method to decrease cement composition density may be to add additional water during preparation of the cement composition as water is typically less dense than other components in the cement composition. The additional water may allow the cement composition to be prepared to lower densities but may also result in free water separating from the cement composition as the cement composition is introduced into a wellbore and allowed set. However, the addition of GVC may allow higher weight ratios of water to be included in a cement composition as the GVC may act as a water extender by taking up additional water added to a cement composition. Methods of designing a cement composition using the water requirement of GVC and other cement compositions will be discussed in detail below.

The GVC may have any particle size ($D_v50$) suitable for a particular application, including at a point in a range of from about 3 μm to about 200 μm. The $D_v50$ particle size may also be referred to as the median particle size by volume of a particulate material. The $D_v50$ particle size is defined as the maximum particle diameter below which 50% of the material volume exists. The $D_v50$ particle size values for a particular sample may be measured by commercially available particle size analyzers such as those manufactured by Malvern Instruments, Worcestershire, United Kingdom. Alternatively, the GVC may have a particle size in a range of from about 3 μm to about 50 μm, at a point in a range of from about 50 μm to about 100 μm, at a point in a range of from about 100 μm to about 150 μm, at a point in a range of from about 150 μm to about 200, or any points therebetween. One of ordinary skill in the art, with the benefit of this disclosure, should be able to select an appropriate particle size of GVC to include in a cement composition.

The GVC may have any specific gravity suitable for a particular application. One of the potential advantages of including a GVC in a cement composition is that GVC is a relatively low-density material as compared to other cement components such as Portland cement. Some examples of GVC may have a specific gravity at a point in a range of about 1.7 to about 3.3. Alternatively, the GVC may have a specific gravity at a point in a range of from about 1.7 to about 2, at a point in a range of from about 2 to about 2.3, at a point in a range of from about 2.3 to about 2.6, at a point in a range of from about 2.6 to about 3, at a point in a range of from about 3 to about 3.3, or any ranges therebetween. Any specific gravity disclosed herein are merely exemplary and the specific gravity for any particular sample of GVC may fall outside the ranges explicitly recited. One of ordinary skill in the art, with the benefit of this disclosure, should be able to determine the specific gravity associated with any sample of GVC.

A cement composition may include GVC, a source of hydroxide ions, and water. Generally, the GVC may be present in the cement composition in any desired concentration, including at a point in a range of from about 1% to about 80% by weight of the cement composition. Alternatively, the GVC may be present in the cement composition at a point in a range of from about 1% to about 10% by weight of the cement composition, at a point in a range of from about 10% to about 20% by weight of the cement composition, at a point in a range of from about 20% to about 30% by weight of the cement composition, at a point in a range of from about 30% to about 40% by weight of the cement composition, at a point in a range of from about 40% to about 50% by weight of the cement composition, at a point in a range of from about 50% by weight of the cement composition to about 60% by weight of the cement composition, at a point in a range of from about 60% to about 70% by weight of the cement composition, at a point in a range of from about 70% to about 80% by weight of the cement composition, or any points therebetween. One of ordinary skill in the art, with the benefit of this disclosure, should be able to select an appropriate amount of GVC to include in a cement composition. Additionally, a cement composition may be prepared with the major component being the GVC with little to no other components that set hydraulically in the presence of water. For example, a composition may be prepared which includes water, a source of hydroxide ions, and GVC in a weight ratio of about 3:1 to about 5:1 GVC to hydroxide ions. The exact stoichiometry and therefore weight ratio of GVC to source of hydroxide ions may vary depending on the source of hydroxide ions.

The source of hydroxide ions may be any source of hydroxide ions suitable for use in a cement composition. Some examples of sources of hydroxide ions may be compounds which release hydroxide when mixed with water such as calcium hydroxide or compounds which react with water or other compounds and release hydroxide ions such as Portland cement. Other sources of hydroxide ions may include, but are not limited to, hydrated lime, cement kiln dust, and lime kiln dust, for example The source of hydroxide ions may include hydrated lime. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included in examples of the cement compositions, for example, to form a hydraulic composition with the pozzolan or GVC. For example, the hydrated lime may be included in a pozzolan or GVC-to-hydrated-lime weight ratio of about 10:1 to about 1:1 or a ratio of about 3:1 to about 5:1. Where present, the hydrated lime may be included in the cement compositions in an amount at a point in a range of from about 1% to about 40% by weight of the cement composition, for example. In some examples, the hydrated lime may be present in an amount ranging between any of and/or including any of about 1%, about 10%, about 20%, about 30%, or about 40% by weight of the cement composition. In some examples, the cementitious components present in the cement composition may consist essentially of GVC and hydrated lime mixed with water. For example, the cementitious components may primarily include the GVC and the hydrated lime without any additional cementitious components (e.g., Portland cement) that hydraulically set in the presence of water. One of ordinary skill in the art, with the benefit of this disclosure, will recognize the appropriate amount of hydrated lime to include for a chosen application.

The water may be from any source provided that it does not contain an excess of compounds that may undesirably affect other components in the cement compositions. For example, a cement composition may include fresh water, salt water such as brine (e.g., saturated saltwater produced from subterranean formations) or seawater, or any combination thereof. Salt water generally may include one or more dissolved salts therein and may be saturated or unsaturated as desired for a particular application. Seawater or brines may be suitable for use in some examples of the cement composition. Further, the water may be present in an amount sufficient to form a pumpable slurry. Generally, the water may be added to the cement composition in any desired concentration, including at a point in a range of from about 10% to about 80% by weight of the cement composition. Alternatively, the water may be present in the cement composition at a point in a range of from an amount of about 10% to about 30% by weight of the cement composition, at a point in a range of from about 30% to about 50% by weight of the cement composition, at a point in a range of from about 50% to about 60% by weight of the cement composition, at a point in a range of from about 60% to about 70% by weight of the cement composition, at a point in a range of from about 70% to about 80% by weight of the cement composition or any points therebetween. One of ordinary skill in the art, with the benefit of this disclosure, should be able to select an appropriate amount of water to include in a cement composition.

The cement composition may have a density suitable for a particular application. By way of example, the cement composition may have a density at a point in a range of from about of from about 4 pounds per gallon ("lb/gal") (479 kg/m$^3$) to about 20 lb/gal (2396 kg/m$^3$). Alternatively, the cement composition may have a density at a point in a range of from about 4 lb/gal (479 kg/m$^3$) to about 7 lb/gal (839 kg/m$^3$), at a point in a range of from about 7 lb/gal (839 kg/m$^3$) to about 10 (1198 kg/m$^3$), at a point in a range of from about 10 lb/gal (1198 kg/m$^3$) to about 13 lb/gal (1558 kg/m$^3$), at a point in a range of from about 13 lb/gal (1558 kg/m$^3$), to about 16 lb/gal (1917 kg/m$^3$), at a point in a range of from about 16 lb/gal to about 20 lb/gal, or any points therebetween. As discussed above, the density of cement may be an important design factor as the density range of cement may be limited by the formation properties. One method to control density may be to increase the fraction of water included in the cement composition. However, increasing water fraction generally leads to a cement with a lower compressive strength and increased free water which may be unsuitable for some applications. One of the potential advantages of including GVC in the cement composition is that GVC is a relatively low-density material compared to other cementitious components, has a high water requirement, and has pozzolanic activity that may contribute to compressive strength. Pozzolanic activity may be the ability of a compound to react with lime, typically in the form of hydrated lime, to form a hardened mass. Cement compositions prepared with GVC may be prepared to lower densities than neat cement compositions which do not contain GVC. GVC may absorb excess water resulting in more stable cement compositions with reduced free water and increased compressive strength. As will be illustrated in the examples below, cement compositions which include GVC may have higher compressive strengths as compared to neat cement compositions which do not include GVC at the same densities.

The cement composition may further include hydraulic cement. In some instances, the hydraulic cement may be included in the cement composition as a source of hydroxide ions. Any of a variety of hydraulic cements may be suitable including those including calcium, aluminum, silicon, oxygen, iron, and/or sulfur, which set and harden by reaction with water. Specific examples of hydraulic cements that may be suitable include, but are not limited to, Portland cements, pozzolana cements, gypsum cements, alumina based cements, silica cements, and any combination thereof. Examples of suitable Portland cements may include those classified as Classes A, B, C, G, or H cements according to American Petroleum Institute, *API Specification for Materials and Testing for Well Cements*, API Specification 10, Fifth Ed., Jul. 1, 1990. Additional examples of suitable Portland cements may include those classified as ASTM Type I, II, III, IV, or V.

The hydraulic cement may be included in the cement composition in an amount (or concentration). The amount of the hydraulic cement may be selected, for example, to provide a particular compressive strength for the cement composition after setting. Where used, the hydraulic cement may be included in an amount in a range of from about 1% to about 80% by weight of the cement composition. By way of example, the hydraulic cement may be present in an amount ranging between any of and/or including any of about 1%, about 5%, about 10%, about 20%, about 30%, about 40%, about 50%, about 60%, about 70%, or about 80% by weight of the cement composition. In one particular example, the hydraulic cement may be present in an amount in a range of from about 25% to about 75% by weight of the cement composition and, alternatively, from about 40% to 60% by weight of the cement composition. One of ordinary skill in the art, with the benefit of this disclosure, should recognize the appropriate amount of the hydraulic cement to include for a chosen application.

In some examples, the cement composition may further include a lightweight additive. The lightweight additive may be included to reduce the density of examples of the cement composition. For example, the lightweight additive may be used to form a lightweight cement composition, for example, having a density of less than about 13 lb/gal (1558 kg/m$^3$). The lightweight additive typically may have a specific gravity of less than about 2.0. Examples of suitable lightweight additives may include sodium silicate, hollow microspheres, gilsonite, perlite, and combinations thereof. Where used, the lightweight additive may be present in an amount in the range of from about 0.1% to about 20% by weight of the cement composition, for example. In alternative examples, the lightweight additive may be present in an amount in the range of from about 1% to about 10% by weight of the cement composition.

In some examples, the cement composition may be foamed and include water, GVC, a source of hydroxide ions, a foaming agent, and a gas. Optionally, to provide a cement composition with a lower density and more stable foam, the foamed cement composition may further comprise a lightweight additive, for example. With the lightweight additive, a base slurry may be prepared that may then be foamed to provide an even lower density. In some embodiments, the foamed cement composition may have a density in the range of from about 4 lb/gal (479 kg/m$^3$) to about 13 lb/gal (1558 kg/m$^3$) and, alternatively, about 7 lb/gal (839 kg/m$^3$) to about 9 lb/gal (1078 kg/m$^3$). In one particular example, a base slurry may be foamed from a density of in the range of from about 9 lb/gal (1078 kg/m$^3$) to about 13 lb/gal (1558 kg/m$^3$) to a lower density, for example, in a range of from about 7 lb/gal (839 kg/m$^3$) to about 9 lb/gal (1078 kg/m$^3$).

The gas used in embodiments of the foamed cement composition may be any suitable gas for foaming the cement composition, including, but not limited to air, nitrogen, and combinations thereof. Generally, the gas should be present in examples of the foamed cement composition in an amount sufficient to form the desired foam. In certain embodiments, the gas may be present in an amount in the range of from about 5% to about 80% by volume of the cement composition fluid at atmospheric pressure, alternatively, about 5% to about 55% by volume, and, alternatively, about 15% to about 30% by volume.

Where foamed, examples of the cement composition may include a foaming agent for providing a suitable foam. As used herein, the term "foaming agent" refers to a material or combination of materials that facilitate the formation of a foam in a liquid. Any suitable foaming agent for forming a foam in an aqueous liquid may be used in embodiments of the cement composition. Examples of suitable foaming agents may include, but are not limited to: anionic, nonionic, amphoteric (including zwitterionic surfactants), cationic surfactant, or mixtures thereof, betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant, mixtures of an ammonium salt of an alkyl ether sulfate, and combinations thereof. Generally, the foaming agent may be present in embodiments of the cement composition fluids in an amount sufficient to provide a suitable foam. In some embodiments, the foaming agent may be present in an amount in the range of from about 0.8% to about 5% by volume of the water ("bvow").

The cement compositions may further include a pozzolan such as fly ash, silica fume, metakaolin, volcanic glasses, other natural glasses or combinations thereof. An example of a suitable pozzolan may include fly ash. An additional example of a suitable pozzolan may include a natural pozzolan. Natural pozzolans are generally present on the Earth's surface and set and harden in the presence of hydrated lime and water. Examples including of natural pozzolans may include natural glasses, diatomaceous earth, volcanic ash, opaline shale, tuff, and combinations thereof. The cement compositions may include fly ash. A variety of fly ashes may be suitable, including fly ash classified as Class C or Class F fly ash according to American Petroleum Institute, ASTM C618-15, "Standard Specification for Coal Fly Ash and Raw or Calcined Natural Pozzolan for Use in Concrete" published 2015. Where used, the fly ash generally may be included in the cement compositions in an amount desired for a particular application. In some examples, the fly ash may be present in the cement composition in an amount in the range of from about 1% to about 60% by weight of the cement composition (e.g., about 5%, about 10%, about 15%, about 20%, about 25%, about 30%, about 35%, about 40%, about 45%, about 50%, about 55%, etc.). In some examples, the fly ash may be present in the cement composition in an amount in the range of from about 1% to about 35% by weight of the cement composition. In some examples, the fly ash may be present in the cement composition in an amount in the range of from about 1% to about 10% by weight of the cement composition. Alternatively, the amount of fly ash may be expressed by weight of dry solids. For example, the fly ash may be present in an amount in a range of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some examples, the fly ash may be present in an amount in the range of from about 1% to about 20% and, alternatively, from about 1% to about 10% by weight of dry solids.

The cement composition may further include slag. Slag is generally a granulated, blast furnace by-product from the production of cast iron including the oxidized impurities found in iron ore. The slag may be included in examples of the cement compositions in an amount suitable for a particular application. Where used, the slag may be present in an amount in the range of from about 0.1% to about 40% by weight of the cement composition. For example, the slag may be present in an amount ranging between any of and/or including any of about 0.1%, about 10%, about 20%, about 30%, or about 40% by weight of the cement composition.

The cement composition may further include shale in an amount sufficient to provide the desired compressive strength, density, and/or cost. A variety of shales are suitable, including those including silicon, aluminum, calcium, and/or magnesium. Examples of suitable shales include vitrified shale and/or calcined shale. Where used, the shale may be present in an amount in the range of from about 0.1% to about 40% by weight of the cement composition. For example, the shale may be present in an amount ranging between any of and/or including any of about 0.1%, about 10%, about 20%, about 30%, or about 40% by weight of the cement composition. One of ordinary skill in the art, with the benefit of this disclosure, should recognize the appropriate amount of the shale to include for a chosen application.

Some examples of the cement compositions may include silica sources in addition to the GVC; for example, crystalline silica and/or amorphous silica. Crystalline silica is a powder that may be included in examples of the cement compositions, for example, to prevent cement compressive strength retrogression. Amorphous silica is a powder that may be included in examples of the cement compositions as a lightweight filler and/or to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process. Examples including additional silica sources may utilize the additional silica source as needed to enhance compressive strength or set times.

The cement composition may further include kiln dust. "Kiln dust," as that term is used herein, refers to a solid material generated as a by-product of the heating of certain materials in kilns. The term "kiln dust" as used herein is intended to include kiln dust made as described herein and equivalent forms of kiln dust. In some instances, the kiln dust may be included in the cement composition as a source of hydroxide ions. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. Problems may also be associated with the disposal of lime kiln dust, which may be generated as a by-product of the calcination of lime. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. In some examples, the kiln dust may be present in the cement composition in an amount in the range of from about 1% to about 60% by weight of the cement composition (e.g., about 5%, about 10%, about 15%, about 20%, about 25%, about 30%, about 35%, about 40%, about 45%, about 50%, about 55%, etc.). In some examples, the fly ash may be present in the cement composition in an amount in the range of from about 1% to about 35% by weight of the cement composition. In some examples, the fly ash may be present in the cement composition in an amount in the range of from about 1% to about 10% by weight of the cement composition. Alternatively, the amount of fly ash may be expressed by weight of dry solids. For example, the fly ash may be present in an amount in a range of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some examples, the fly ash may be present in an amount in the range of from about 1% to about 20% and, alternatively, from about 1% to about 10% by weight of dry solids.

The cement composition may further include a set retarder. A broad variety of set retarders may be suitable for use in the cement compositions. For example, the set retarder may include phosphonic acids, such as ethylenediamine tetra(methylene phosphonic acid), diethylenetriamine Penta(methylene phosphonic acid), lignosulfonates, such as sodium lignosulfonate, calcium lignosulfonate, salts such as stannous sulfate, lead acetate, monobasic calcium phosphate, organic acids, such as citric acid, tartaric acid, cellulose derivatives such as hydroxyl ethyl cellulose (HEC) and carboxymethyl hydroxyethyl cellulose (CMHEC), synthetic co- or ter-polymers including sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement compositions in an amount sufficient to delay the setting for a desired time. In some examples, the set retarder may be present in the cement compositions in an amount in the range of from about 0.01% to about 10% by weight of the cement composition. In specific examples, the set retarder may be present in an amount ranging between any of and/or including any of about 0.01%, about 0.1%, about 1%, about 2%, about 4%, about 6%, about 8%, or about 10% by weight of by weight of the cement composition. One of ordinary skill in the art, with the benefit of this disclosure, will recognize the appropriate amount of the set retarder to include for a chosen application.

The cement composition may further include a set accelerator. Set accelerators may be included in the cement compositions to, for example, increase the rate of setting reactions. Control of setting time may allow for the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof. In some examples, the set accelerator may be present in the cement compositions in an amount in the range of from about 0.01% to about 10% by weight of the cement composition. In specific examples, the set accelerator may be present in an amount ranging between any of and/or including any of about 0.01%, about 0.1%, about 1%, about 2%, about 4%, about 6%, about 8%, or about 10% by weight of by weight of the cement composition. One of ordinary skill in the art, with the benefit of this disclosure, will recognize the appropriate amount of the set accelerator to include for a chosen application.

The cement composition may further include a dispersant. Examples of suitable dispersants include, without limitation, sulfonated-formaldehyde-based dispersants (e.g., sulfonated acetone formaldehyde condensate) and polycarboxylated ether dispersants. In some examples, a dispersant may be included in the cement compositions in an amount in the range of from about 0.01% to about 5% by weight of the cement composition. In specific examples, the dispersant may be present in an amount ranging between any of and/or including any of about 0.01%, about 0.1%, about 0.5%, about 1%, about 2%, about 3%, about 4%, or about 5% by weight of the cement composition. One of ordinary skill in the art, with the benefit of this disclosure, will recognize the appropriate amount of the dispersant to include for a chosen application.

The cement composition may further include a free water control additive. As used herein, the term "free water control additive" refers to an additive included in a liquid for, among other things, reducing or preventing the presence of free water in the cement composition. Free water control additive may also reduce or prevent the settling of solids. Examples of suitable free water control additives include, but are not limited to, bentonite, amorphous silica, hydroxyethyl cellulose, and combinations thereof. The free water control additive may be provided as a dry solid in some embodiments. Where used, the free water control additive may be present in an amount in the range of from about 0.1% to about 16% by weight of dry solids, for example. In alternative embodiments, the free water control additive may be present in an amount in the range of from about 0.1% to about 2% by weight of dry solids.

The cement composition may further include a fluid-loss-control additive. A fluid-loss-control additive may decrease the volume of fluid that is lost to the subterranean formation Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers including a backbone of lignin or lignite and pendant groups including at least one member selected from the group consisting of 2-acrylamido-2-methylpropanesulfonic acid, acrylonitrile, and N,N-dimethylacrylamide, for example.

Other additives suitable for use in subterranean cementing operations also may be included in examples of the cement compositions. Examples of such additives include, but are not limited to weighting agents, gas-generating additives, mechanical-property-enhancing additives, lost-circulation materials, filtration-control additives, defoaming agents, thixotropic additives, and combinations thereof. In examples, one or more of these additives may be added to the cement compositions after storing but prior to the placement of a cement composition into a wellbore. A person having ordinary skill in the art, with the benefit of this disclosure, should readily be able to determine the type and amount of additive useful for a particular application and desired result.

In some examples, the cement compositions may set to have a desirable compressive strength. Compressive strength is generally the capacity of a material or structure to withstand axially directed pushing forces. The compressive strength may be measured at a specified time after the cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a USA™ ultrasonic cement analyzer, available from Fann Instrument Company, Houston, Tex. Compressive strength values may be determined in accordance with API RP 10B-2, *Recommended Practice for Testing Well Cements*, First Edition, July 2005. By way of example, the cement compositions may develop a 24-hour compressive strength in the range of from about 50 psi (345 kPa) to about 5000 psi (34474 kPa), alternatively, from about 100 psi (689 kPa) to about 4500 psi (31026 kPa), or alternatively from about 500 psi (3447 kPa) to about 4000 psi (27578 kPa). In some examples, the cement compositions may develop a compressive strength in 24 hours of at least about 50 psi (345 kPa), at least about 100 psi (689 kPa), at least about 500 psi (3447 kPa), or more. In some examples, the compressive strength values may be determined using destructive or non-destructive methods at a temperature ranging from 100° F. (38° C.) to 200° F. (93° C.).

The exemplary cement compositions disclosed herein may be used in a variety of subterranean operations, including primary and remedial cementing. The cement composition may be introduced into a wellbore and allowed to set therein. As used herein, introducing the cement composition into a subterranean formation includes introduction into any portion of the subterranean formation, including, without limitation, into a wellbore drilled into the subterranean formation, into a near wellbore region surrounding the wellbore, such as a subterranean formation, or into both. In primary cementing, the cement composition may be introduced into an annular space between a conduit located in a wellbore and the walls of a wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore. In remedial cementing, a cement composition may be used, for example, in squeeze-cementing operations or in the placement of cement plugs. By way of example, the composition may be placed in a wellbore to plug an opening (e.g., a void or crack) in the formation, in a gravel pack, in the conduit, in the cement sheath, and/or between the cement sheath and the conduit (e.g., a microannulus).

The components of the cement composition may be combined in any order desired to form a cement composition that can be placed into a subterranean formation. In addition, the components of the cement compositions may be combined using any mixing device compatible with the composition, including a bulk mixer, for example. In one particular example, a cement composition may be prepared by dry blending the solid components of the cement composition at a bulk plant, for example, and thereafter combining the dry blend with water when desired for use. For example, a dry blend may be prepared that includes the GVC and the other dry cement components. Liquid additives (if any) may be combined with the water before the water is combined with the dry components or added directly to a mixer tub.

As discussed above, GVC may have a higher water requirement per unit mass of GVC as compared to hydraulic cements such as Portland cement. The relatively higher water requirement may be beneficial when designing cements with reduced density, as additional water added to reduce density may be taken up by the GVC. A cement composition may be designed by providing a target cement density and a target free water. In some applications, a target free water may be about 0% to about 5% by volume free water. The techniques described herein may allow one of ordinary skill in the art to prepare a cement composition including GVC that is substantially free of free water upon setting. A cement composition may be calculated that meets the density target and the free water target by iteratively generating cement compositions including a hydraulic cement and GVC and comparing the calculated density and free water from water requirement of the hydraulic cement and GVC. The high water requirement of the GVC may also be beneficial when reducing density of a cement composition. A cement composition may be provided that includes a hydraulic cement at an initial density. As one of ordinary skill in the art will appreciate, the density of a cement may be directly correlated to the water content and final compressive strength of the cement composition. As discussed above, the GVC may be included in a cement composition to reduce cementitious material content, such as hydraulic cement, and therefore reduce cost. The cement composition may be prepared by adding additional water and increasing the mass fraction of GVC in the cement composition until the compressive strength of the cement composition is equal to that of the composition that does not contain GVC.

Accordingly, the present disclosure may provide methods, systems, and apparatus that may relate to cement compositions including GVC. The methods, systems, and apparatus may include any of the various features disclosed herein, including one or more of the following statements.

Statement 1. A method comprising: providing a cement composition comprising ground vitrified clay, hydrated lime, and water; and introducing the cement composition into a subterranean formation.

Statement 2. The method of statement 1 wherein the ground vitrified clay is a product of vitrification of clay and minerals.

Statement 3. The method of statement 2 wherein the vitrification comprises heating a mixture of the clay, slate, and shale, above a glass transition temperature of the mixture and cooling the mixture to below the glass transition temperature, thereby producing a solid ceramic structure characterized by a glassy phase comprised of vitrification products of the clay, the slate, and the shale.

Statement 4. The method of any of statements 1-3 wherein the ground vitrified clay comprises ground vitrified pipe.

Statement 5. The method of any of statements 1-4 wherein the ground vitrified clay and the hydrated lime are present in a weight ratio of ground vitrified clay to hydrated lime of about 10:1 to about 1:1.

Statement 6. The method of any of statements 1-5 wherein the cement composition does not contain additional cementitious components that hydraulically set in the presence of water.

Statement 7. The method of any of statements 1-6 wherein the cement composition further comprises a hydraulic cement.

Statement 8. The method of any of statements 1-7 wherein the cement composition further comprises at least one additional component selected form the group consisting of fly ash, cement kiln dust, slag, perlite, natural glass, and combinations thereof.

Statement 9. The method of any of statements 1-8 wherein the cement composition has a density of about 11 lb/gal (1318 kg/m$^3$) to about 16 lb/gal (1917 kg/m$^3$).

Statement 10. A cement composition comprising: ground vitrified clay; hydrated lime; and water.

Statement 11. The cement composition of statement 10 wherein the ground vitrified clay is a product of vitrification of clay, slate, and shale.

Statement 12. The cement composition of any of statements 10-11 wherein the ground vitrified clay is ground vitrified pipe.

Statement 13. The cement composition of any of statements 10-12 wherein the ground vitrified clay and the hydrated lime are present in a weight ratio of ground vitrified clay to hydrated lime of about 10:1 to about 1:1.

Statement 14. The cement composition of any of statements 10-13 wherein the cement composition further comprises a hydraulic cement.

Statement 15. A method comprising: preparing a cement composition comprising: ground vitrified clay; hydrated lime; and water, wherein the cement composition has a density of about 13 lb/gal (1557 kg/m$^3$) or less; and introducing the cement composition into a wellbore annulus.

Statement 16. The method of statement 15 wherein the ground vitrified clay is a product of vitrification of clay, slate, and shale.

Statement 17. The method of any of statements 15-16 wherein the ground vitrified clay is ground vitrified pipe.

Statement 18. The method of any of statements 15-17 wherein the ground vitrified clay and the hydrated lime are present in a weight ratio of ground vitrified clay to hydrated lime of about 10:1 to about 1:1.

Statement 19. The method of any of statements 15-18 wherein the cement slurry further comprises Portland cement in an amount of less than 50% by weight of dry components of the cement slurry.

Statement 20. The method of any of statements 15-19 wherein the cement composition further comprises at least one additional component selected form the group consisting of fly ash, cement kiln dust, slag, perlite, natural glass, and combinations thereof.

Figure 2:
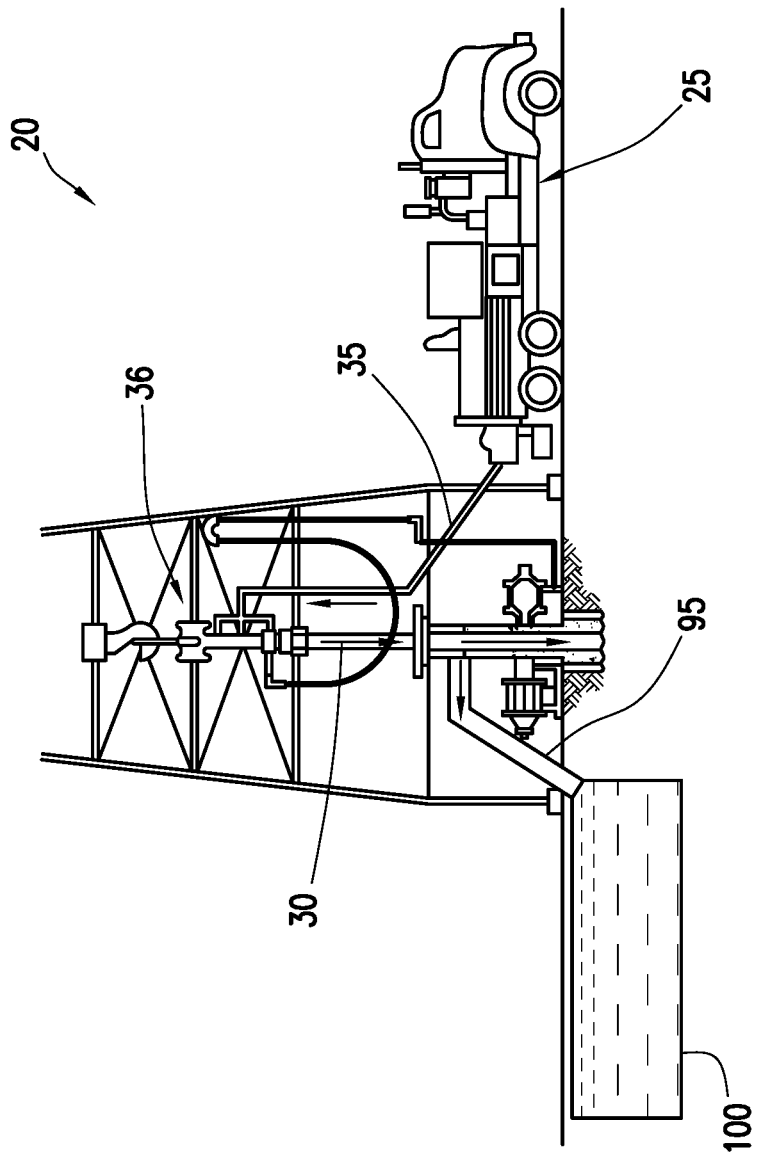
FIG. 2 is a schematic illustration of example surface equipment that may be used in the placement of a cement composition com including ground vitrified clay in a wellbore.

Example methods of using the GVC in well cementing will now be described in more detail with reference to FIGS. 1-3. FIG. 1 illustrates an example system 5 for preparation of a cement composition including GVC and delivery of the cement composition to a wellbore. The cement composition may be any cement composition disclosed herein. As shown, the cement composition may be mixed in mixing equipment 10, such as a jet mixer, re-circulating mixer, or a batch mixer, for example, and then pumped via pumping equipment 15 to the wellbore. In some examples, the mixing equipment 10 and the pumping equipment 15 may be disposed on one or more cement trucks as will be apparent to those of ordinary skill in the art. In some examples, a jet mixer may be used, for example, to continuously mix a dry blend including the cement composition, for example, with the water as it is being pumped to the wellbore.

An example technique for placing a cement composition into a subterranean formation will now be described with reference to FIGS. 2 and 3. FIG. 2 illustrates example surface equipment 20 that may be used in placement of a cement composition. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 20 may include a cementing unit 25, which may include one or more cement trucks. The cementing unit 25 may include mixing equipment 10 and pumping equipment 15 (e.g., FIG. 1) as will be apparent to those of ordinary skill in the art. The cementing unit 25 may pump a cement composition 30, which may include water and a cement composition including agglomerated zeolite catalyst, through a feed pipe 35 and to a cementing head 36 which conveys the cement composition 30 downhole.

Figure 3:
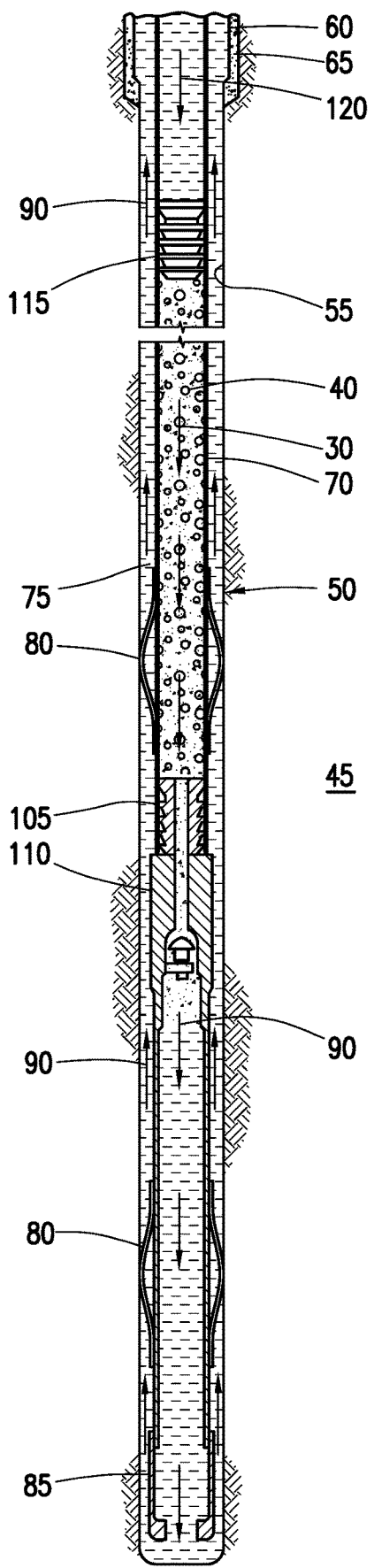
FIG. 3 is a schematic illustration of the example placement of a cement composition including ground vitrified clay into a wellbore annulus.

Turning now to FIG. 3, the cement composition 30, including GVC, may be placed into a subterranean formation 45. As illustrated, a wellbore 50 may be drilled into one or more subterranean formations 45. While the wellbore 50 is shown extending generally vertically into the one or more subterranean formation 45, the principles described herein are also applicable to wellbores that extend at an angle through the one or more subterranean formations 45, such as horizontal and slanted wellbores. As illustrated, the wellbore 50 includes walls 55. In the illustrated example, a surface casing 60 has been inserted into the wellbore 50. The surface casing 60 may be cemented to the walls 55 of the wellbore 50 by cement sheath 65. In the illustrated example, one or more additional conduits (e.g., intermediate casing, production casing, liners, etc.), shown here as casing 70 may also be disposed in the wellbore 50. As illustrated, there is a wellbore annulus 75 formed between the casing 70 and the walls 55 of the wellbore 50 and/or the surface casing 60. One or more centralizers 80 may be attached to the casing 70, for example, to centralize the casing 70 in the wellbore 50 prior to and during the cementing operation.

With continued reference to FIG. 3, the cement composition 30 may be pumped down the interior of the casing 70. The cement composition 30 may be allowed to flow down the interior of the casing 70 through the casing shoe 85 at the bottom of the casing 70 and up around the casing 70 into the wellbore annulus 75. The cement composition 30 may be allowed to set in the wellbore annulus 75, for example, to form a cement sheath that supports and positions the casing 70 in the wellbore 50. While not illustrated, other techniques may also be utilized for introduction of the cement composition 30. By way of example, reverse circulation techniques may be used that include introducing the cement composition 30 into the subterraneous formation 45 by way of the wellbore annulus 75 instead of through the casing 70.

As it is introduced, the cement composition 30 may displace other fluids 90, such as drilling fluids and/or spacer fluids that may be present in the interior of the casing 70 and/or the wellbore annulus 75. At least a portion of the displaced fluids 90 may exit the wellbore annulus 75 via a flow line 95 and be deposited, for example, in one or more retention pits 100 (e.g., a mud pit), as shown on FIG. 2. Referring again to FIG. 3, a bottom plug 105 may be introduced into the wellbore 50 ahead of the cement composition 30, for example, to separate the cement composition 30 from the other fluids 90 that may be inside the casing 70 prior to cementing. After the bottom plug 105 reaches the landing collar 110, a diaphragm or other suitable device should rupture to allow the cement composition 30 through the bottom plug 105. In FIG. 3, the bottom plug 105 is shown on the landing collar 110. In the illustrated example, a top plug 115 may be introduced into the wellbore 50 behind the cement composition 30. The top plug 115 may separate the cement composition 30 from a displacement fluid 120 and push the cement composition 30 through the bottom plug 105.

The exemplary cement compositions including GVC disclosed herein may directly or indirectly affect one or more components or pieces of equipment associated with the preparation, delivery, recapture, recycling, reuse, and/or disposal of the GVC and associated cement compositions. For example, the GVC may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the cement compositions including GVC and fluids containing the same. The disclosed GVC may also directly or indirectly affect any transport or delivery equipment used to convey the GVC to a well site or downhole such as, for example, any transport vessels, conduits, pipelines, trucks, tubulars, and/or pipes used to compositionally move the GVC from one location to another, any pumps, compressors, or motors (e.g., topside or downhole) used to drive the agglomerated zeolite catalyst, or fluids containing the same, into motion, any valves or related joints used to regulate the pressure or flow rate of the GVC (or fluids containing the same), and any sensors (i.e., pressure and temperature), gauges, and/or combinations thereof, and the like. The disclosed GVC may also directly or indirectly affect the various downhole equipment and tools that may come into contact with the GVC such as, but not limited to, wellbore casings, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, terrorizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present disclosure, the following examples of some of the preferred examples are given. In no way should such examples be read to limit, or to define, the scope of the disclosure.

Example 1

The following example illustrates the use of GVP as a pozzolanic material. Pozzolanic cement slurries were prepared according to the formulations illustrated in Table 1.

TABLE 1

|  | Slurry 1 | Slurry 2 | Slurry 3 |
| --- | --- | --- | --- |
| Material | Wt. (g) | Wt. (g) | Wt. (g) |
| Ground Vitrified Pipe | 100 | — | — |
| Fly Ash | — | 100 | — |
| Natural Glass | — | — | 100 |
| Hydrated Lime | 20 | 20 | 20 |
| Water | 85.6 | 68.9 | 73.4 |
| Specific Gravity of Pozzolan | 2.7 | 2.2 | 2.3 |
| Slurry Density (lb/gal) (kg/m$^3$) | 13 (1558) | 13 (1558) | 13 (1558) |

Each of the slurries was prepared by weighing dry components into a container and added until blended. Water was weighed and added to a blender and the dry components were mixed into eh water at 4,000 RPM stirring. The blender speed was increased to 12,000 RPM for about 35 seconds. After mixing, each slurry was poured into 2 inch (2.54 cm) by 4 inch (10.16 cm) cylindrical molds and placed in a water bath at 140° F. (60° C.) and atmospheric pressure. After 7 days the cylinders were removed from the water baths and molds and subjected to unconfined compressive strength testing. The results are shown in Table 2.

TABLE 2

|  | Material | Compressive Strength (psi) (kPa) |
| --- | --- | --- |
| Slurry 1 | Ground Vitrified Pipe | 537 (3702) |
| Slurry 2 | Fly Ash | 259 (1785) |
| Slurry 3 | Natural Glass | 372 (2564) |

It can be observed from the results of Table 2 that cement slurries containing GVP function well as a pozzolanic material. The compressive strength development observed places it as a more effective pozzolan than fly and natural glass.

Example 2

As discussed above, GVP can be included in cement compositions with other cementitious components that hydrate and set to form a hardened mass in the presence of water. In this example, GVP will be tested in low-Portland cement formulations. The compressive strength of GVP was tested against Portland cement and supplementary cementitious materials to (SCMs) to determine the effectiveness of GVP as a lightweight SCM. Five cement slurries were prepared according to Table 3 with the investigated material being varied. The investigated material was 25.2% by weight of the dry blend, type I/II Portland cement was 31.3% by weight of the dry blend (BWOB), type F fly ash was 43.5% by weight of the dry blend, and water was varied in each cement blend by mixing each slurry to 13.0 pounds per gallon (lb/gal). Each of the investigated materials was dry blended with the Portland cement and fly ash and thereafter mixed with water in a blender to API specifications outlined in API RP-10B2 published April 2013. The slurries were cured in cylindrical molds for 3 days at 3000 psi (20684 kPa) and 180° F. (82° C.), after which the cured cements were removed from the molds and subjected to unconfined compressive strength testing. The results of the compressive strength tests are shown in Table 4 alongside the investigated materials.

TABLE 3

| Material | Formulation (% BWOB) |
|---|---|
| Investigated Material | 25.2 Wt. % |
| Type I/II Portland Cement | 31.3 Wt. % |
| Fly Ash Type F | 43.5 Wt. % |
| Water | x |

TABLE 4

| Investigated Material | Compressive Strength (psi) (kPa) |
|---|---|
| GVP | 1236 (8522) |
| Fly Ash | 1024 (7060) |
| Ground Granulated Blast Furnace Slag | 1236 (8522) |
| Rice Husk Ash | 1031 (7108) |
| Silica Fume | 900 (6205) |

It was observed that the cement slurry containing GVP outperforms other pozzolanic materials and is similar in performance to hydraulic materials such as ground granulated blast furnace slag.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The examples disclosed above are illustrative only, as the present embodiments may be modified and practiced in different but equivalent manners apparent to those skilled in the art having the benefit of the teachings herein. Although individual examples are discussed, the present disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A cement composition comprising:
   ground vitrified clay;
   hydrated lime; and
   water; wherein the ground vitrified clay is ground vitrified pipe.

2. The cement composition of claim 1 wherein the ground vitrified clay is ground vitrified pipe.

3. The cement composition of claim 1 wherein the ground vitrified clay and the hydrated lime are present in a weight ratio of ground vitrified clay to hydrated lime of about 10:1 to about 1:1.

4. The cement composition of claim 1 wherein the cement composition further comprises a hydraulic cement.

5. A composition comprising:
   ground vitrified clay;
   hydrated lime; and
   water;
   wherein the ground vitrified clay comprises ground vitrified pipe.

6. The composition of claim 5 wherein the ground vitrified pipe is a product of vitrification of clay and minerals.

7. The composition of claim 5 wherein ground vitrified pipe is a product of heating a mixture of the clay, slate, and shale, above a glass transition temperature of the mixture and cooling the mixture to below the glass transition temperature, thereby producing a solid ceramic structure characterized by a glassy phase comprised of vitrification products of the clay, the slate, and the shale.

8. The composition of claim 5 wherein the ground vitrified clay and the hydrated lime are present in a weight ratio of ground vitrified clay to hydrated lime of about 10:1 to about 1:1.

9. The composition of claim 5 wherein the composition does not contain additional cementitious components that hydraulically set in the presence of water.

10. The composition of claim 5 wherein the composition further comprises a hydraulic cement.

11. The composition of claim 5 wherein the cement composition further comprises at least one additional component selected form the group consisting of fly ash, cement kiln dust, slag, perlite, natural glass, and combinations thereof.

12. The composition of claim 5 wherein the cement composition has a density of about 11 lb/gal (1318 kg/m$^3$) to about 16 lb/gal (1917 kg/m$^3$).

13. A composition comprising:
ground vitrified clay, wherein the ground vitrified clay is a product of vitrification of clay, slate, and shale;
Portland cement in an amount of less than 50% by weight of dry components of the cement composition;
hydrated lime; and
water.

14. The composition of claim 13, wherein the ground vitrified clay and the hydrated lime are present in a weight ratio of ground vitrified clay to hydrated lime of about 10:1 to about 1:1.

15. The composition of claim 13, wherein the cement composition further comprises at least one additional component selected form the group consisting of fly ash, cement kiln dust, slag, perlite, natural glass, and combinations thereof.

16. The composition of claim 13, wherein the cement composition does not contain additional cementitious components that hydraulically set in the presence of water.

17. The composition of claim 13, wherein the vitrification comprises heating a mixture of the clay, slate, and shale, above a glass transition temperature of the mixture and cooling the mixture to below the glass transition temperature, thereby producing a solid ceramic structure characterized by a glassy phase comprised of vitrification products of the clay, the slate, and the shale.

18. The composition of claim 13, wherein the cement composition further comprises Portland cement in an amount of less than 50% by weight of dry components of the cement composition.

19. The composition of claim 13, further comprising a foaming agent and a gas, wherein the composition has a density in the range of from about 4 lb/gal (479 kg/m$^3$) to about 13 lb/gal (1558 kg/m$^3$).

* * * * *